United States Patent Office 3,471,506
Patented Oct. 7, 1969

3,471,506
PROCESS FOR PREPARING 5-CHLORO-2,3-PYRIDINE DIOL
Jorgen C. C. Lei, Kalvehave, and Niels Clauson-Kaas, Farum, Denmark, assignors to Geigy Chemical Corporation, Ardsley, N.Y., a corporation of New York
No Drawing. Filed Aug. 28, 1967, Ser. No. 663,569
Claims priority, application Denmark, Aug. 31, 1966, 12,637/66
Int. Cl. C07d 31/02, 31/10, 31/28
U.S. Cl. 260—297     6 Claims

ABSTRACT OF THE DISCLOSURE 5-chloro-2,3-pyridine diol which is a useful intermediate in the production of other valuable compounds, and a process for the preparation thereof by reacting furfural with at least double the molar amount of chlorine and further reacting the resulting reaction mixture with at least the equimolar amount of sulfamic acid.

---

This invention relates to a novel process for the production of a pyridine derivative and more particularly to a novel process for the production of 5-chloro-2,3-pyridine diol, a compound which has not been known up to now.

It has surprisingly been found that 5-chloro-2,3-pyridine diol can be produced from an easily accessible starting material, namely furfural, by treating the latter at temperatures of about 0°, preferably 0°, in an aqueous medium with a chlorinating agent affording, per molar amount of furfural, at least double the molar amount of chlorine, preferably with gaseous chlorine or with the equivalent amount of a substance or system giving off chlorine, and further treating the resulting reaction mixture at temperatures of between 30° and 60° with an amount of sulfamic acid which is at least equimolar to the amount of furfural employed in the reaction, and recovering the 5-chloro-2,3-pyridine diol formed by the usual methods well known in the art.

During the addition of the first half of the chlorine to the furfural the pH is maintained at, preferably, between 2 and 0, and during the addition of the second half of the chlorine, preferably, between 0 and −1, while a pH of below 1 is preferred in the subsequent reaction of the furfural/chlorine reaction mixture with sulfamic acid.

As reaction medium for the chlorination step of the reaction, preferably, water is used without any other additives except, if necessary, a usual anti-foaming agent. The chlorination, however, can also be performed, particularly if high concentrations of the reaction components are employed, e.g. in aqueous-alkanolic media if desired, e.g. in aqueous methanol, ethanol or tert. butanol, or aqueous acetic acid.

As substances or systems giving off chlorine, for example, sodium hypochlorite or additional hydrochloric acid together with hydrogen peroxide are used.

The pH desired in any phase of the sequence of reactions according to the invention, can be attained by the addition of compounds having an acid reaction, provided that the pH has not already been suitably adjusted by the reaction components and reaction products. A suitable acid compound is, e.g., hydrochloric acid.

The reaction with sulfamic acid is performed in the same medium as the chlorination and within the temperature range given above, preferably at about 50°. The 5-chloro-2,3-pyridine diol gradually precipitates and the precipitation is completed after the reaction by cooling. The crude product obtained is purified, e.g. by recrystallisation, preferably from acetic acid. The 5-chloro-2,3-pyridine diol which is produced according to the invention is obtained in the form of pale green platelets which melt at 290–295° (Hershberg apparatus, corrected). It is practically insoluble in water but it dissolves in sufficiently strong aqueous solutions of acids or bases with salt formation. In addition, it has some solubility in most polar organic solvents.

Surprising and decisive for the success of the inventive process is the fact that on reaction of furfural with chlorine and subsequent reaction of the furfural/chlorine reaction mixture with sulfamic acid, under the reaction conditions according to the invention, side reactions of the reaction components are so insignificant that 5-chloro-2,3-pyridine diol is obtained as a main product.

The hitherto undescribed 5 - chloro-2,3-pyridine diol, now easily accessible according to the novel process of the invention, is a valuable intermediate, particularly for the production of agricultural chemicals and dyestuffs. It forms, for example, complexes with heavy metal ions, which exhibit useful antimicrobial properties.

The following non-limitative examples further illustrate the invention. The temperatures throughout the specification and claims are given in degrees centigrade and percentages are given by weight.

Example 1

(a) 71.3 g. of chlorine (43.0 ml. measured at −80°, 1.005 mols) are introduced within 100 minutes through a cylindrical porous glass filter into a 0° cold suspension of 48.7 g. of freshly distilled furfural (42.0 ml., 0.507 mol) in water, the addition being made while stirring vigorously. After the introduction of half the amount of chlorine (after 40 minutes), 42 ml. (0.50 mol) of concentrated hydrochloric acid and 5 drops of polypropylene glycol (e.g. No. 2025 of Union Carbide) are added. After all the chlorine has been introduced, the reaction mixture is stirred for 30 minutes at −5° to 0°, then filtered to remove a small amount of a sticky precipitate, and diluted with water to a volume of 500 ml.

(b) 75.0 g. (0.77 mol) of sulfamic acid are added to the reaction mixture obtained according to (a) and the thin slurry obtained is heated for 10 minutes at 50° while stirring. The sulfamic acid dissolves, the reaction mixture turns orange-red and, after a few minutes, 5-chloro-2,3-pyridine diol begins to precipitate in the form of a pale yellow precipitate. The mixture is stirred for 1 hour at 50°, then cooled to 10° and is kept for 15 minutes at this temperature. The precipitate, which is now brown, is filtered off under suction. The filter cake is slightly compressed and washed on the filter with water until the latter runs off pale yellow coloured. The filter cake is then stirred into a paste with water, which is again filtered as dry as possible and dried for 15 hours at 80° whereupon 48 g. of crude product are obtained as a pale brown powder.

To obtain pure substance, e.g. 250 mg. are sublimed for 90 minutes at 200° under 0.2 torr whereupon 215 mg. of 5-chloro-2,3-pyridine diol (M.P. 290–295°), (corresponding to 56% of the theoretical, calculated on the furfural) are obtained. The substance gives a strong blue reaction to ferric chloride. The position of the chlorine atom was determined from the NMR spectrum.

Crystallisation from acetic acid, for example, can serve for the purification of larger amounts. From 5.00 g. of crude product, 3.34 g. of 5-chloro-2,3-pyridine diol (corresponding to 44% of the theoretical) are obtained by crystallisation from 70 ml. of acetic acid while decolouring with active charcoal (1 g.). The product is sufficiently pure for analysis.

Example 2

2.91 g. of 5-chloro-2,3-pyridine diol (0.02 mol) are dissolved in 500 ml. of 90% ethanol. 2.0 g. of copper acetate monohydrate (0.01 mol) in 100 ml. of 80% ethanol are added dropwise to this solution. A grey-green precipitate is formed constituting a Cu (II) 2:1 complex of 5-chloro-2,3-pyridine diol. To the resulting suspension 40 ml. of a 0.001 molar sodium ethylate solution in ethanol (0.04 mol) is added dropwise during one hour under stirring at room temperature, whereby the precipitate dissolves. On evaporation of this solution to $\frac{1}{10}$ of its volume a finely dispersed grey-green precipitate of the disodium salt of the above complex is obtained. It is filtered off by suction and dried at 30° in the vacuum (11 mm. Hg).

What is claimed is:

1. The process for the production of 5-chloro-2,3-pyridine diol which comprises:
   (a) treating furfural in an aqueous medium with a chlorinating agent selected from the group consisting of gaseous chlorine, sodium hypochlorite and hydrochloric acid in the presence of hydrogen peroxide, affording, per molar amount of furfural, at least double the molar amount of chlorine,
   (b) treating the reaction mixture resulting from step (a) with an amount of sulfamic acid which is at least equimolar to the amount of furfural employed in step (a), and
   (c) recovering 5-chloro-2,3-pyridine diol from the reaction mixture.

2. The process as defined in claim 1 wherein in step (a) during the treatment with the first half of said chlorinating agent selected from the group consisting of gaseous chlorine, sodium hypochlorite and hydrochloric acid in the presence of hydrogen peroxide, the pH is maintained at between 2 and 0, and during the treatment with the second half of said chlorinating agent the pH is maintained at between 0 to −1, and wherein step (b) is performed at a pH of below 1.

3. The process as defined in claim 2 wherein step (a) is performed at temperatures of −5° to 0° and step (b) at temperatures of between 30° and 60°.

4. The process as defined in claim 3 wherein step (b) is performed at a temperature of 50°.

5. The process as defined in claim 3 wherein said chlorinating agent is gaseous chlorine.

6. The process as defined in claim 3 wherein said aqueous medium is water.

References Cited

UNITED STATES PATENTS 2,583,425   1/1952   Hawley _____ 424—331

OTHER REFERENCES

Chemical Abstracts, vol. 51, par. 12, 153 (1957); abstracting British Patent No. 765,529, published Jan. 9, 1957.

Frobisher: Fundamentals of Microbiology, seventh edition, Saunders, pp. 158, 159 and 286.

HENRY R. JILES, Primary Examiner

A. L. ROTMAN, Assistant Examiner

U.S. Cl. X.R.

260—270; 424—263